US006859496B1

(12) United States Patent
Boroczky et al.

(10) Patent No.: US 6,859,496 B1
(45) Date of Patent: Feb. 22, 2005

(54) ADAPTIVELY ENCODING MULTIPLE STREAMS OF VIDEO DATA IN PARALLEL FOR MULTIPLEXING ONTO A CONSTANT BIT RATE CHANNEL

(75) Inventors: Lilla Boroczky, Endicott, NY (US); Agnes Y. Ngai, Endwell, NY (US); Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 09/225,193

(22) Filed: Jan. 5, 1999

Related U.S. Application Data

(63) Continuation-in-part of application No. 09/087,603, filed on May 29, 1998, now abandoned.

(51) Int. Cl.[7] ................................................. H04N 7/12

(52) U.S. Cl. .............. 375/240.26; 375/240; 375/240.01

(58) Field of Search ........................... 375/240, 240.26, 375/240.01

(56) References Cited

U.S. PATENT DOCUMENTS

| | | | |
|---|---|---|---|
| 5,533,021 A | | 7/1996 | Branstad et al. ........... 370/60.1 |
| 5,537,408 A | | 7/1996 | Branstad et al. .............. 370/79 |
| 5,565,920 A | | 10/1996 | Lee et al. .................... 348/398 |
| 5,598,213 A | | 1/1997 | Chung et al. ............... 348/405 |
| 5,619,337 A | * | 4/1997 | Naimpally .................... 386/83 |
| 5,650,860 A | | 7/1997 | Uz ............................. 358/430 |
| 5,699,119 A | | 12/1997 | Chung et al. ............... 348/405 |
| 5,793,425 A | * | 8/1998 | Balakrishnan ......... 375/240.25 |
| 5,861,919 A | | 1/1999 | Perkins et al. |
| 6,038,256 A | * | 3/2000 | Linzer et al. ............... 375/240 |
| 6,040,861 A | * | 3/2000 | Boroczky et al. ...... 375/240.12 |
| 6,195,388 B1 | * | 2/2001 | Choi et al. ............. 375/240.05 |

FOREIGN PATENT DOCUMENTS

| | | |
|---|---|---|
| JP | 06-062393 | 3/1994 |
| JP | 06-268985 | 9/1994 |
| JP | 07-184192 | 7/1995 |

(List continued on next page.)

OTHER PUBLICATIONS

International Organisation for Standardisation—Coding of Moving Pictures and Associated Audio, "Information Technology—Generic Coding of Moving Pictures" Recommendation H.222.0, Nov. 13, 1994, ISO/IEC 13818–1, p. 15.

Gertjan Keesman, "Multi–Program Video Compression Using Joint Bit–Rate Control", Philips Journal of Research, vol. 50, No. 1/2, 1996, pp. 21–45.

Mike Perkins and David Arnstein, "Statistical Multiplexing of Multiple MPEG–2 Video Programs in a Single Channel", SMPTE Journal, Technical Paper, Sep. 1995, pp. 596–599.

(List continued on next page.)

*Primary Examiner*—Allen Wong
(74) *Attorney, Agent, or Firm*—William H. Steinberg, Esq.; Kevin P. Radigan, Esq.; Heslin Rothenberg Farley & Mesiti P.C.

(57) ABSTRACT

A control strategy is provided for dynamically encoding multiple streams of video data in parallel for multiplexing onto a constant bit rate channel. The control strategy allows individual encode bit rates to be dynamically adjusted for each video data stream based in part on relative complexity of the multiple streams of video data, as well as fullness of compressed video data buffers and a channel buffer coupled between the encoders and the constant bit rate channel. The control strategy includes analyzing the multiple streams of video to determine relative complexity thereof, encoding the multiple streams of video frames in parallel, and dynamically adapting encoding of at least one stream of the video frames based on the relative complexity of the video frames. The bit rate for each stream of video frames is only changed at GOP boundaries, or if a scene change occurs. The calculated bit rate is preferably further modified based upon buffer fullness.

32 Claims, 5 Drawing Sheets

FOREIGN PATENT DOCUMENTS

| | | |
|---|---|---|
| JP | 07-264580 | 10/1995 |
| JP | 08-098185 | 4/1996 |
| JP | 09-051538 | 2/1997 |
| JP | 09-116520 | 5/1997 |
| JP | 09-252290 | 9/1997 |
| WO | WO99-01987 | 1/1999 |

OTHER PUBLICATIONS

Limin Wang and Andre Vincent, "Joint Rate Control for Multi–Program Video Coding", IEEE Transactions on Consumer Electronics, vol., 42, No. 3, Aug. 1996, pp. 300–305.

Ajanta Guha and Daniel J. Reininger, "Multichannel Joint Rate Control of VBR MPEG Encoded Video For DBS Applications", IEEE Transactions on Consumer Electronics, vol. 40, No. 3, Aug. 1994, pp. 616–623.

Mahesh Balakrishnan and Robert Cohen, "Global Optimization of Multiplexed Video Encoders", IEEE International Conference on Image Processing, Oct. 26–29, 1997, pp. 377–380.

\* cited by examiner

ADAPTIVELY ENCODING MULTIPLE STREAMS OF VIDEO DATA IN PARALLEL FOR MULTIPLEXING ONTO A CONSTANT BIT RATE CHANNEL

CROSS-REFERENCE TO RELATED APPLICATIONS

This application comprises a continuation-in-part patent application from commonly assigned, co-pending patent application Ser. No. 09/087,603, filed May 29, 1998, now abandoned, by Boroczky et al. entitled "CONTROL STRATEGY FOR DYNAMICALLY ENCODING MULTIPLE STREAMS OF VIDEO DATA IN PARALLEL FOR MULTIPLEXING ONTO A CONSTANT BIT RATE CHANNEL," and is related to commonly assigned, co-pending patent application Ser. No. 09/948,442, by Boroczky et al. entitled "ADAPTIVE REAL-TIME ENCODING OF VIDEO SEQUENCE EMPLOYING IMAGE STATISTICS." Both of these commonly assigned, co-pending patent applications are hereby incorporated herein by reference in their entirety.

TECHNICAL FIELD

This invention relates in general to compression of digital visual images, and more particularly, to a control strategy for dynamically encoding multiple streams of video data in parallel for multiplexing onto a constant bit rate channel. The control strategy comprises a strategy which allows individual encode bit rates to be dynamically adjusted within each video data stream based in part on relative complexity of the multiple streams of video data. Relative complexity is evaluated, in part, using a look-ahead approach wherein picture statistics are predetermined for each video data stream prior to encoding thereof.

BACKGROUND OF THE INVENTION

The emergence of various digital video technologies in industries such as broadcast television, communications networks, consumer electronics, and multimedia computers continues to increase at a remarkable rate. This widespread use of digital video applications is motivated by the fact that signal processing, editing and data transfer of digital information is much easier compared with processing of analog representations. But as importantly, digital video owes its popularity to the several standards that have been created for digital video compression in recent years.

Digital video compression solutions are arguably the most important component of any digital video platform. Since digital video is known to contain an enormous amount of information in uncompressed format, its manipulation, storage, and transmission cans be very time consuming and expensive, if not impossible. As a result, digital video compression techniques have been devised to reduce the overwhelming volume of data while preserving the perceptual quality of its content. A compatible video decompression scheme is then used to uncompress the data for playback.

The MPEG-2 International Standard formed by the Moving Pictures and Expert Group, and described in ISO/IEC 13818-2, "Information Technology–Generic Coding of Moving Pictures and Associated Audio Information: Video 1996," which is hereby incorporated herein by reference in its entirety, is intended to standardize compression for the industries noted above. The ISO MPEG-2 standard specifies the syntax of the encoded bitstream and semantics of the decoding process. The choice of coding parameters and tradeoffs in performance versus complexity, however, are left to the encoder developer.

The efficiency of the MPEG-2 encoding system is assessed by the fidelity of the perceived video transmitted over a fixed communication bandwidth or stored into a digital medium. For some applications, such as digital satellite systems, multiple programs are multiplexed into a single large stream for broadcasting, and a bank of MPEG-2 encoders is used to monitor and encode all programs, while attempting to maintain the quality of the received channels. The MPEG-2 stream is sent over either a fixed communications bandwidth or a dynamic bandwidth as in asynchronous transfer mode (ATM) networks.

In typical statistical multiplexing systems, such as direct broadcast satellite (DBS) applications, several video bitstreams (or programs) are multiplexed onto one single constant bit rate channel. Unfortunately, encoding of each program at a predefined constant bit rate can lead to picture quality degradation due to changes of scene content in the programs over time. The problem becomes more complex if the operation of the encoders is not aligned in time, such as when the video sources have different coding carried out and/or different group of picture (GOP) structures.

A need thus exists in the art for a multi-program compression technique which dynamically distributes available bandwidth among the programs in order to optimize overall video quality of the system. The present invention provides such a technique by employing a joint rate control strategy which guides the individual encoders dynamically during the encoding process.

DISCLOSURE OF THE INVENTION

Briefly described, in one aspect a method is presented in accordance with the principles of this invention for processing multiple streams of video frames. This method includes: analyzing the multiple streams of video frames to determine relative complexity of the video frames comprising the multiple streams of video frames, wherein the analyzing comprises obtaining picture statistics on the relative complexity of the video frames prior to encoding the multiple streams of video frames; encoding, the multiple streams of video frames in parallel using the relative complexity of the video frames, wherein the encoding comprises adapting encoding of the multiple streams of video frames with change in the relative complexity of the video frames; and during the encoding, analyzing each stream of video frames to derive coding statistics on at least one characteristic thereof, the coding statistics comprising at least one of an intraframe characteristic or an interframe characteristic, and wherein the adaptively encoding comprises employing both the picture statistics and the coding statistics in adaptively encoding the multiple streams of video frames.

In another aspect, a method for processing multiple streams of video frames is presented which includes: analyzing the multiple streams of video frames to derive picture statistics on at least one characteristic thereof, the at least one characteristic comprising at least one of an intraframe characteristic or an interframe characteristic; encoding the multiple streams of video frames in parallel, the encoding including employing at least one controllable encode parameter for each stream of video frames; adapting the encoding of the multiple streams of video frames using relative information from the picture statistics obtained from the multiple streams of video frames, the adapting including adjusting the at least one controllable encode parameter employed in the encoding of at least one stream of video frames, wherein the encoding of the multiple streams of video frames is adaptive to relative changes in the at least one characteristic; and during the encoding, analyzing each stream of video frames to derive coding statistics on at least one coding characteristic, the at least one coding characteristic comprising at least one of an intraframe coding characteristic or an interframe coding characteristic, and wherein the adapting comprises employing the coding statistics in combination with the picture statistics in adapting the, encoding of the at least one stream of video frames.

In a further aspect, a system is provided for processing multiple streams of video frames. This system includes means for analyzing the multiple streams of video frames to determine picture statistics representative of relative complexity of the video frames comprising the multiple streams of video frames, and multiple encoders for encoding the multiple streams of video frames in parallel. Each encoder receives one stream of the multiple streams of video frames. The multiple encoders each comprise means for generating coding statistics on at least one, coding characteristic of the stream of video frames being encoded thereby, wherein the coding characteristics comprise at least one of an intraframe characteristic or an interframe characteristic. The system further includes a joint controller coupled to each encoder and to the means for analyzing for dynamically adapting encoding of at least one stream of video frames of the multiple streams of video frames based on the picture statistics and the coding statistics derived from the video frames comprising the multiple streams of video frames.

In still another aspect, this invention comprises a system for processing multiple streams of video frames. The system includes means for analyzing the multiple streams of video frames to derive picture statistics on at least one characteristic thereof, the at least one characteristic comprising at least one of an intraframe characteristic or an interframe characteristic. Multiple encoders are provided for encoding the multiple streams of video frames in parallel, each encoder receiving one stream of video frames of the multiple streams of video frames, and each encoder employing at least one controllable encode parameter in encoding its stream of video frames. The multiple encoders comprise coding means for analyzing each stream of video frames during the encoding to derive coding statistics on at least one coding characteristic. The at least one coding characteristic comprises at least one of an intraframe coding characteristic or an interframe coding characteristic. The system further includes a joint controller coupled to each encoder and to the means for analyzing for dynamically adapting encoding of at least one stream of video frames of the multiple streams of video frames based on relative information derived from the picture statistics and the coding statistics. The adapting of encoding includes adjusting at least one controllable encode parameter employed in the encoding of at least one stream of video frames, wherein the encoding of the multiple streams of video frames is adaptive to changes in the relative information.

In a still further aspect, an article of manufacture is provided which includes at least one computer usable medium having computer readable program code means embodied therein for causing the processing of multiple streams of video frames. The computer readable program code means in the article of manufacture includes: computer readable program code means for causing a computer to effect analyzing the multiple streams of video frames to determine relative complexity of the video frames comprising the multiple streams of video frames, wherein the analyzing comprises obtaining picture statistics on the relative complexity of the video frames prior to encoding of the multiple streams of video frames; computer readable program code means for causing a computer to effect encoding the multiple streams of video frames in parallel using the relative complexity of the video frames, wherein the encoding comprises adaptively encoding the multiple streams of video frames with change in the relative complexity thereof; and computer readable program code means for causing a computer to effect analyzing each stream of video frames during the encoding to derive coding statistics on at least one characteristic thereof, the coding statistics comprising at least one of an intraframe characteristic or an interframe characteristic, and wherein the computer readable program code means for causing a computer to effect adaptively encoding comprises computer readable program code means for causing a computer to effect employing both the picture statistics and the coding statistics in adaptively encoding the multiple streams of video frames.

In yet another aspect, an article of manufacture is provided which includes at least one computer usable medium having-computer readable program code means embodied therein for causing the processing of multiple streams of video frames. The computer readable program code means in the article of manufacture includes: computer readable program code means for causing a computer to effect analyzing the multiple streams of video frames to derive picture statistics on at least one characteristic thereof, the at least one characteristic comprising at least one of an intraframe characteristic or an interframe characteristic; computer readable program code means for causing a computer to effect encoding the multiple streams of video frames in parallel, the encoding including employing at least one controllable encode parameter for each stream of video frames; computer readable program code means for causing a computer to effect adapting the encoding of the multiple streams of video frames using relative information from the picture statistics obtained from the multiple streams of video frames, the adapting including adjusting the at least one controllable encode parameter employed in the encoding of the at least one stream of video frames, wherein the encoding of the multiple streams of video frames is adaptive to changes in the relative information; and computer readable program code means for causing a computer to effect analyzing each stream of video frames during the encoding to derive coding statistics on at least one coding characteristic, the at least one coding characteristic comprising at least one of an intraframe coding characteristic or an interframe coding characteristic, and wherein the computer readable program code means for causing a computer to effect adapting comprises computer readable program code means for causing a computer to effect employing the coding characteristics in combination with the picture statistics in adapting the encoding of the at least one stream of video frames.

To restate, presented herein is a system solution for statistical multiplexing (stat-mux) which encodes several video programs in parallel using, for example, MPEG-2 compatible video encoders. A joint rate control strategy is presented which dynamically allocates bit rates among the encoders. The bit rate of each encoder is determined based, for example, on relative complexities of the programs and scene changes occurring within the programs being encoded. Relative complexity is evaluated using one or both of "image statistics" obtained prior to encoding a particular picture and "coding statistics" obtained as a result of coding a particular picture. Thus, image statistics characterize a current picture yet to be encoded, while coding statistics provide information on the previous picture encoded.

From these two types of statistics, enhanced allocating of bit rate among the multiple video streams is accomplished. Furthermore, look-ahead processing at both startup and scene changes allows for accurate bit rate distribution notwithstanding the lack of history for the new scene. For example, channel bit rate can be distributed adaptively among the encoders at start of encoding based on scene content of the video sources instead of using predefined fixed bit rates, as would be necessary for a purely feedback approach. Look-ahead processing also allows quick reaction for scene changes, while a purely feedback approach would require unavoidable delay.

The encoding of video sources is not restricted to requiring the same GOP structure and GOP length in each encoder. Advantageously, each encoder can change its bit rate at GOP boundaries, while still operating at constant bit rate inside the GOPs. Overall, this strategy results in a piece-wise constant, but variable bit rate compression. The encoders can operate with different GOP-lengths and structures, and can be encoding at different times. Thus, there can be time intervals when the sum of the individual bit rates is larger or smaller than the predefined channel bit rate. Further, a strategy is proposed for scene changes which ensures quick reaction of the system to scene changes, thereby resulting in improved picture quality.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
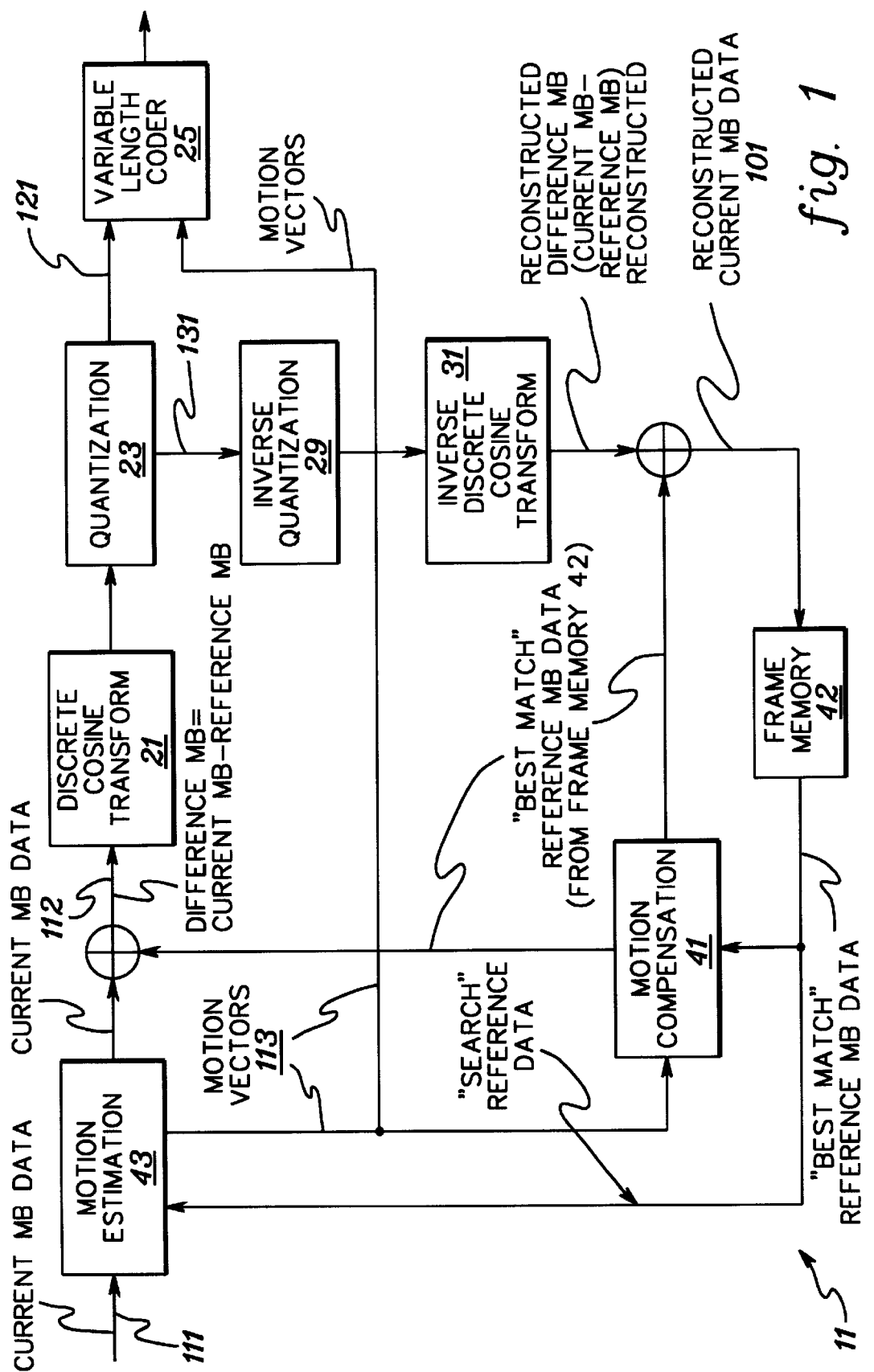
FIG. 1 shows a flow diagram of a generalized MPEG-2 compliant encoder 11, to be employed in a statistical multiplexer (stat-mux) system in accordance with the principles of the present invention.
Figure 2:
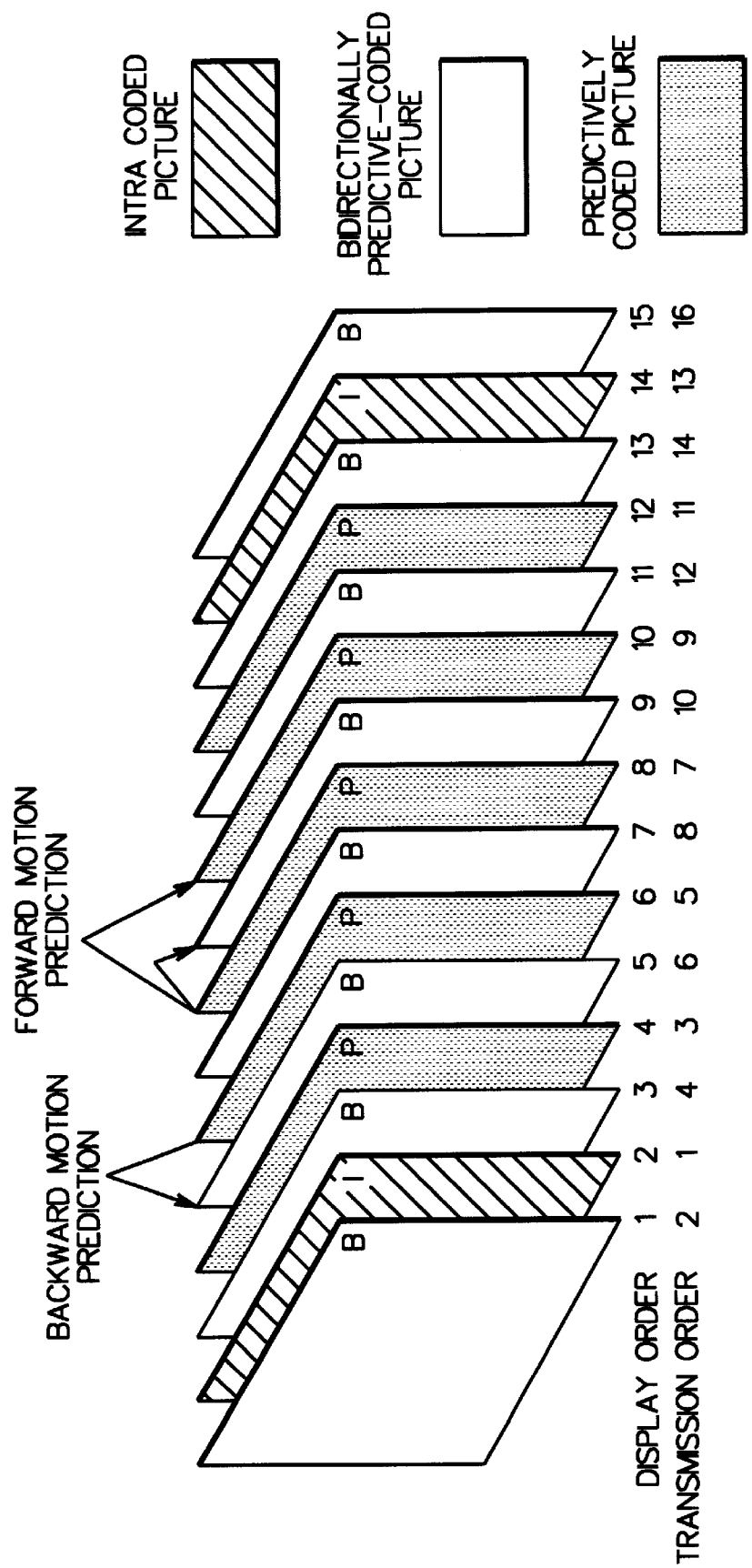
FIG. 2 illustrates I, P, and B pictures, examples of their display and transmission orders, and forward, and backward motion prediction.

As briefly noted above, this invention relates to a statistical multiplexing control strategy for encoding multiple streams (e.g., channels) of video programs in parallel using multiple video encoders. An external joint rate control strategy is employed which dynamically allocates bit rates among the encoders (which may comprise MPEG compliant encoders and encoding processes such as described in the above-incorporated MPEG-2 International Standard). The bit rate of each encoder is determined based on relative complexities of the programs and adjustments are made, e.g., at scene changes and GOP boundaries inside the programs. The proposed technique determines relative complexities using either or both of picture statistics and coding statistics. As used herein, "picture statistics" or "image statistics" refers to information gathered on at least one characteristic of a picture by looking ahead and evaluating pictures still to be encoded. Thus, this aspect of the technique is referred to as a look-ahead approach. The "coding statistics" comprise those statistics discussed in the above-incorporated parent application which are generated commensurate with encoding of a picture and fed back for use in encoding a next picture. Thus, coding statistics provide a historical indication of picture complexity. As described further herein, the present invention selectively employs either picture statistics alone for example, at the start of encoding or whenever there is scene change in one of the, streams of video data, or a combination of picture statistics and coding statistics in a predefined relationship. FIGS. 1 & 2 depict the operation of a single video encoder to be employed in a system in accordance with this invention.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of motion vectors is a key aspect of temporal compression in the MPEG standard. As shown in FIG. 1, once generated, motion vectors are used for the translation of the macroblocks of pixels, from the $i^{th}$ picture to the $i+1^{th}$ picture.

In the encoding process of FIG. 1, the images of the $i^{th}$ picture and the $i+1^{th}$ picture are processed in encoder 11 to generate motion vectors. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer (DCT) 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation.

The various picture types are quantized by encoder 11 in several steps. First, a quantization matrix, unique to a picture type, is applied to an 8×8, DCT block. The elements (weights) of the matrix are chosen such that importance is given to low frequency coefficients. These coefficients contain more information and contribute more to the perceptual quality of the picture. Then, a quantization scaling factor is computed based on the local image activity, complexity of the picture type, and a measure of buffer fullness. This index is directly related to the number of bits allocated to a picture and its perceived quality. The actual number of bits is obtained by first scanning each DCT block and then grouping the quantized coefficients together, according to the procedures defined in the MPEG-2 standard. Each group is entropy coded with a unique variable length code (VLC), using a Huffman lookup table. DC coefficients are encoded, employing differential pulse code modulation (DPCM) (similar to encoding of motion vectors) and uniform quantization.

The output of the entropy coder is input to an entropy decoder. The output of the decoder goes through an inverse scan, inverse quantization and inverse discrete cosine transformation to return a lossy version of the difference macroblock. The decoded picture is then passed through a delay to motion estimation and/or motion compensation, as is known in the art.

The operational functions of an MPEG-2 encoder are discussed in greater detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety. The fundamentals of constant bit rate (CBR) and variable bit rate (VBR) encoding schemes are described with reference to groups of pictures (GOPs) or frames in detail in commonly assigned, co-pending U.S. patent application Ser. No. 09/044,642, by N. Mohsenian, filed Mar. 19, 1998, entitled "Real-Time Single Pass Variable Bit Rate Control Strategy And Encoder," which is hereby incorporated herein by reference in its entirety. Adaptive encoding of a sequence of frames using image statistics such as described herein below, is described in additional detail in commonly assigned, co-pending U.S. patent application Ser. No. 09/046,118, by Boice et al., filed Mar. 20, 1998, entitled "Adaptive Encoding Of A Sequence Of Still Frames Or Partially Still Frames Within Motion Video," which is also hereby incorporated herein by reference in its entirety.

With the above information as background, statistical multiplexing and rate control strategy in accordance with the principles of the present invention is described below with reference to FIGS. 3–5.

In typical statistical multiplexing systems, several video bitstreams are multiplexed onto one single constant bit rate channel. Unfortunately, encoding of each program at a predefined constant bit rate can lead to picture quality degradation due to changes in scene content over time. Thus, the underlying objective of multi-program compression in accordance with the present invention is to dynamically distribute the available bandwidth among the programs in order to maximize the overall video quality of the system. This corresponds to equalizing the picture quality of all programs using a joint rate control algorithm that guides the individual coders. The invention allocates bit rates among the encoders according to the relative scene content of the video sources, while still meeting the requirement of a fixed channel bit rate.

More particularly, a system solution for statistical multiplexing is presented for encoding several video programs in parallel using MPEG-2 compatible video encoders. An external joint rate control algorithm that dynamically allocates bit rates among the encoders is described. The bit rate of each encoder is determined based on relative complexities of the programs and scene changes inside the programs. A system/method in accordance with the present invention does not require the same GOP structure or GOP length in each encoder. Each encoder changes its bit rate at GOP boundaries according to the joint rate control, while it operates at constant bit rate inside the GOPs. Overall, this strategy results in a piece-wise constant, variable bit rate compression. Experimental results show that a multi-program video compression system in accordance with the present invention results in good picture quality, with fast response time to a scene change. Furthermore, commercially available MPEG-2 encoder chips can be used successfully in this system.

Basically, two-different approaches are employed for joint rate control, a feedback approach and a look-ahead approach. In the feedback approach, statistics are generated by the encoders as a by-product of the encoding process. These coding statistics are then used to in part control the bit allocation for subsequent pictures. In the look-ahead approach, statistics are computed by a preprocessor prior to encoding, with these image statistics then being used to adjust the bit rates before encoding the pictures as described herein. With either approach, finding the optimum statistics which describe the complexity of a program can be challenging. In the feedback approach, the statistics are mostly limited to coding related quantities. The look-ahead approach can have more freedom but the price is extra computational complexity and/or additional devices.

Using either or both approaches, a joint rate control algorithm would calculate the bit rate for each picture and carry out the entire rate control for each of the individual encoders. This results in variable bit rate encoding. Conventionally, such a rate control algorithm would require mostly identical GOP structure in each encoder, which is, however, far from reality. Encoders can and do operate in different GOP lengths and structures.

Pursuant to this invention, a solution is disclosed for statistical multiplexing by dynamically allocating bit rates for the encoders using both a look-ahead and a feedback approach. The rate control strategy distributes the channel bit rate among the encoders based on the relative complexity of the programs. The complexity of the programs is determined using picture statistics generated by pre-processors and coding statistics that are generated by the encoders, along with the compressed bitstreams. Alternatively, the encoders could be modified to generate both the picture statistics and the coding statistics by incorporating the preprocessing function therein as will be apparent to one skilled in the art based upon the discussion provided herein.

Instead of calculating the target bit rate for each picture by the joint rate control algorithm, the bit rates are changed at GOP boundaries, or if a scene change occurs. This strategy allows the encoders to operate at constant bit rate inside the GOPs, resulting in a piece-wise constant, but variable bit rate compression. The encoders do not have to have identical GOP structures, that is, GOP boundaries can occur in each encoder at different times. Due to the different GOP structures of the encoders, a channel buffer and a corresponding buffer control feedback loop are incorporated into a system in accordance with the present invention. At scene changes, quick reactions are assured by changing GOP structures dynamically and allowing adequate bit rate changes. The present system/method may be implemented using, for example, International Business Machines' single chip MPEG-2 video encoders, part number IBM39 MPEGS422 PBA 17C.

Section 1 below describes a multi-program video compression system in accordance with the present invention. The joint rate control strategy of this invention is then presented in detail in Section 2. The strategy for joint rate control in the case of scene change is described in Section 3. Determination of the minimum size of the channel buffer and the corresponding channel buffer control is given in Section 4. A possible use of commercially available single chip MPEG-2 encoders in the present system is highlighted in Section 5. A process overview is then given in Section 6.

1. Multi-Program Video Compression System

Figure 3:
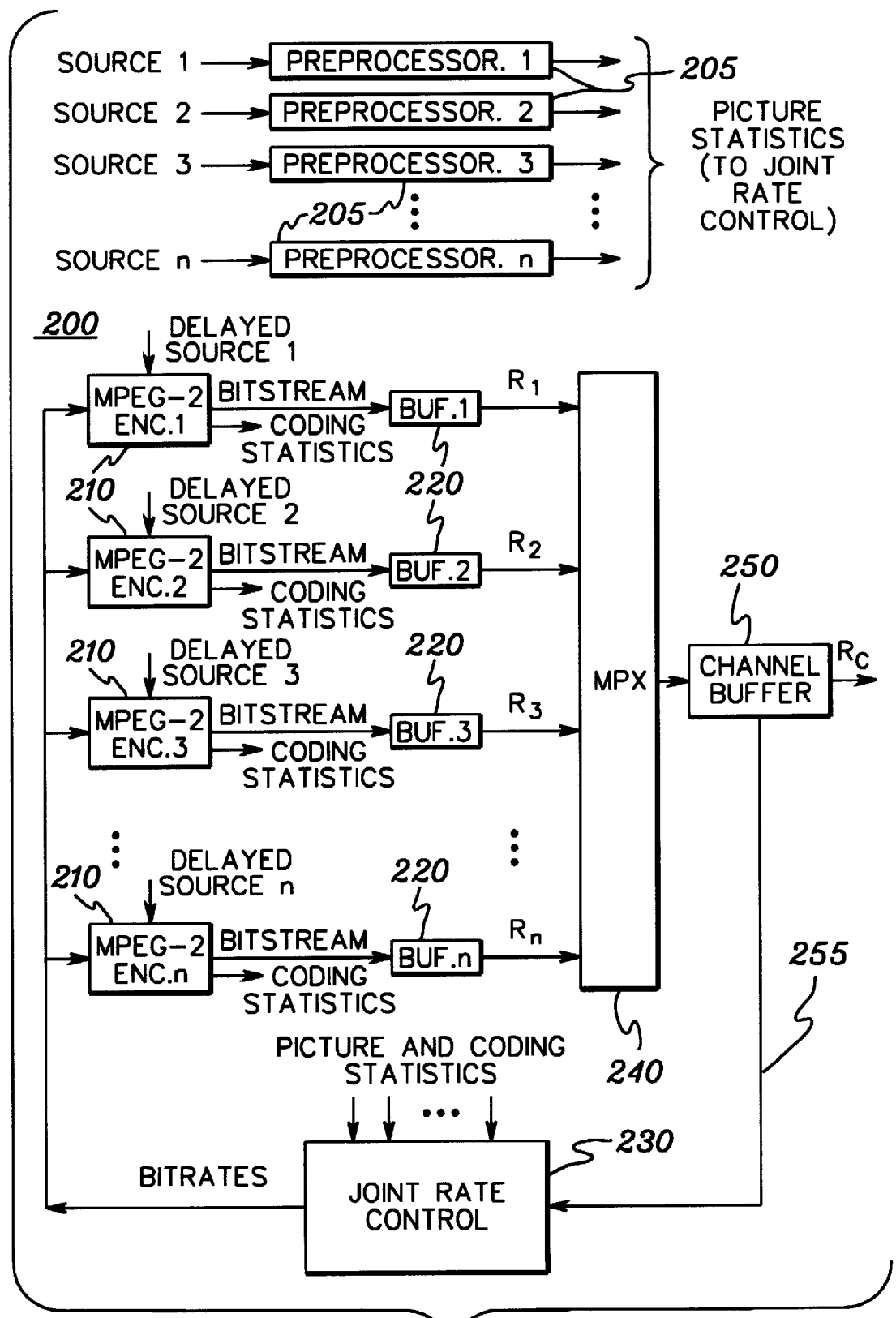
FIG. 3 depicts an example of a multi-stream video compression stat-mux system implemented in accordance with the present invention.
Figure 4:
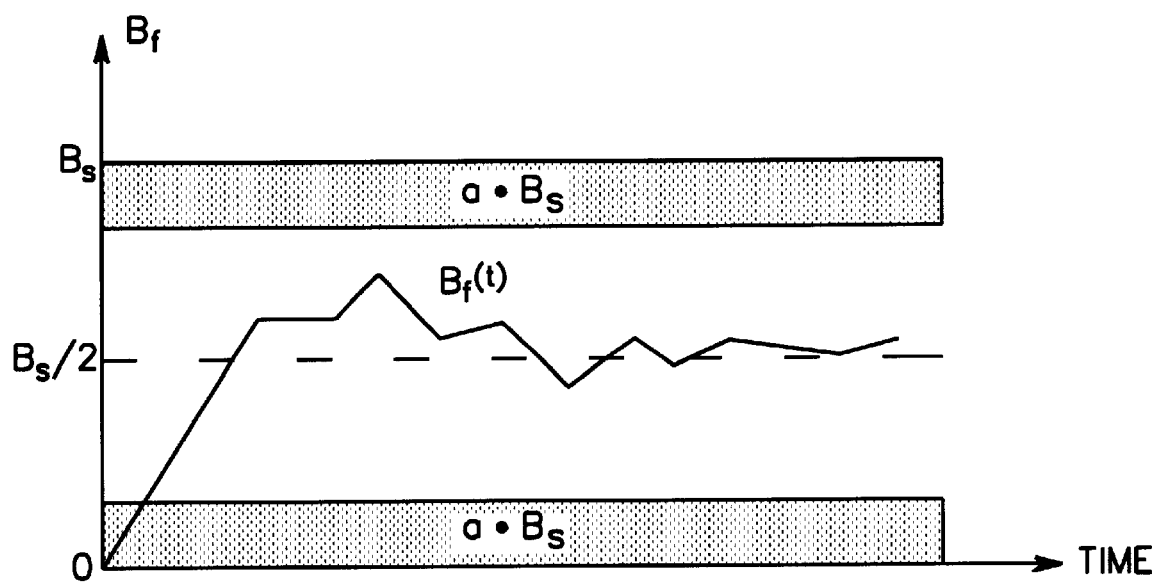
FIG. 4 is an example of channel buffer fullness versus time for a stat-mux system in accordance with the present invention.

FIG. 3 shows a multi-program video compression system 200 to encode several programs (Source 1, Source 2, . . . Source n) in parallel using the approach of the present invention. The example system 200 includes several preprocessors 205 (Preprocessor 1, Preprocessor 2, Preprocessor 3, . . . Preprocessor n) each receiving a corresponding one of the several programs for analyzing the respective stream of video frames in parallel and deriving therefrom picture statistics representative of, for example, an average picture activity.

System 200 also includes several MPEG-2 video encoders 210, individual buffers 220 connected to the encoders 210, a joint rate controller 230, a multiplexer 240, and a channel buffer 250. Encoders 210 each receive a respective delayed program (Delayed Source 1, Delayed Source 2, Delayed Source 3, . . . Delayed Source n) for encoding. The delay is sufficient to allow preprocessors 205 to perform the analysis described hereinbelow. Note that in an alternate embodiments, the picture statistics generating function could be integrated into the MPEG-2 encoders 210 if desired. Each encoder 210 also generates coding statistics about the picture that has just been encoded. These coding statistics, along with the picture statistics, are input parameters to the joint rate control algorithm 230, which calculates the bit rate of each individual encoder dynamically as described herein below.

In the proposed system 200 the bit rate of each encoder 210 is determined based on the relative complexities of the programs (Source 1, Source 2 . . . Source n), and upon occurrence of a scene change inside the corresponding program. The encoders preferably produce bitstreams compatible with the MPEG-2 standard. The scene change detection can be conventionally done either inside or outside of the encoders 210. Each encoder changes its bit rate at GOP boundaries or at scene changes according to the joint rate control 230. This allows the encoders to operate at a constant bit rate (CBR) inside the GOPs using the CBR video buffer verifier model according to the MPEG-2 standard. Overall, this strategy results in a piece-wise constant, but still variable bit rate compression.

The encoding of video sources is not restricted to having identical GOP structures or GOP lengths in each encoder. Since GOP boundaries can occur in each encoder at different times and bit rate changes take effect only at GOP boundaries, channel buffer 250 is employed to compensate possible overflow or underflow of the channel rate. A channel buffer control feedback 255 is also incorporated into the joint rate control algorithm 230 in order to prevent channel buffer 250 overflow or underflow.

In the following description of the present invention, the joint rate control strategy, determination of the minimum size of the channel buffer, and the corresponding channel buffer control are discussed in more detail.

2. Joint Rate Control

The joint rate control strategy presented herein is based on a combined look-ahead and feedback concept wherein statistics are produced prior to encoding (herein "picture statistics"), as well as during encoding (herein "coding statistics"). These statistics are fed into the joint rate controller 230, together with the information on channel buffer 250 fullness. The rate control strategy, which guides the individual encoders during the encoding process, dynamically distributes the available bandwidth among the programs according to their relative complexities. The relative complexities of the programs are determined herein based on the picture statistics and the coding statistics.

Information related to the picture scene content of a frame can be estimated, for example, as the average activity of a frame. It is calculated as the average macroblock activity over an entire frame. Calculating the average activity for several frames ahead of the picture being encoded results in a look-ahead in the joint rate control algorithm. As noted, the average activity can be calculated either inside of the encoders or by preprocessing units (e.g., the preprocessors of FIG. 3). The coding complexity of a program is estimated using coding statistics which are generated by each encoder as a by-product of the encoding process. For example, the coding complexity can be determined based on the bits used for encoding a picture and the average quantization parameter used for, the picture.

Using the picture and coding complexities, the bit rate of an encoder is assumed to be proportional to the weighted sum of two ratios. One is the ratio between the coding complexity of that program and the sum of the coding complexities of all programs. The other ratio is calculated between the average activity of that program using several frame look-aheads and sum of the average activity of all programs. If scene change occurs or at start of encoding, the complexity of a program is preferably solely determined based on the average frame activity (i.e., picture statistics). If no scene change occurs, the picture and coding statistics ratios are used in a predefined relation, for example, in equal parts. One embodiment of a joint rate control strategy in accordance with this invention is presented further below.

Information related to the picture scene content of a frame is determined as the average activity of a frame. At first, the activity of each macroblock in a frame is estimated as:

$$\text{activ}_{MB} = \frac{1}{16 \cdot 16} \cdot \sum_{i=1}^{16} \sum_{j=1}^{16} |\text{lum}(i, j) - \overline{\text{lum}}| \quad (1)$$

where lum(i,j) is the luminance value of pixel (i,j) and lum is the mean luminance value of the macroblock. The average activity of a frame is determined by averaging the macroblock activities over an entire frame:

$$\text{activ}_{frame} = \frac{1}{NMB} \cdot \sum_{k=1}^{NMB} \text{activ}_{MB}(k) \quad (2)$$

where NMB is the number of macroblocks in a frame.

Look-ahead of several frames is incorporated into the joint rate control algorithm by using Eqs. (1) and (2). For example, in our experiments we have calculated the average activity for four frames ahead of the picture being encoded.

The coding complexity of a program is estimated as proposed in the above-incorporated parent application by Boroczky et al., Ser. No. 09/087,603, entitled "Control Strategy For Dynamically Encoding Multiple Streams Of Video Data In Parallel For Multiplexing Onto A Constant Bit Rate Channel." Determination of picture complexity is based on the used bits production model that is similar to the one suggested in MPEG-2 Test Model 5 (See ISO/IEC JTCI/SC29/WG11 NO400, "Test Model 5," April 1993). The coding complexity, $X_i$, of program i is:

$$x_i = (f_i/N_i) \cdot \sum_j b_{ij} \cdot Q_{ij} \quad (3)$$

where $f_i$ is the frame rate of program i, $N_i$ is the number of pictures in the GOP of program i, $b_{ij}$ is bits used for encoding picture j and $Q_{ij}$ is the average quantization parameter of picture j.

Using the picture and coding complexities, the bit rate, $R_i$, of encoder i is determined as:

$$R_i = R_o \cdot \left[ \left( \alpha \cdot x_i / \left( \sum_i x_i \right) \right) + \left( (1-\alpha) \cdot \overline{activ_i} / \left( \sum_i \overline{activ_i} \right) \right) \right] \quad (4)$$

where $R_c$ is the channel bitrate, $X_i$ is the coding complexity and $activ_i$ is the average activity of program i, which is calculated in our experiments as the mean of four frame activities. The parameter $\alpha$ is chosen as 0 at start of encoding or at scene change occurrences. Otherwise, its value is 0.5, which was determined-experimentally. Thus, in case of scene changes or at start, the complexity of a program is solely determined based on the average frame activity. If no scene change occurs, the picture and coding statistics are used in equal parts.

If a scene change occurs, the current GOP is prematurely finished and a new GOP immediately starts as the new scene start. If the last pictures of the old scene are B pictures, the backward prediction is disabled in order to prevent referencing between the old and new scene pictures. The buffer fullness error strategy presented in the above-incorporated parent application is also used in this approach.

Due to the relationship of the program complexities, bit rate changes may occur in a program at any of the GOP boundaries, even if a scene change did not take place in that program. If bit rate changes are too abrupt in a program with no scene cut, the picture quality may vary from GOP to GOP significantly, even if the total quality of the system is improved. To prevent this situation, the bit rate changes will be limited on GOP boundaries, but not at scene changes, where no restrictions are preferably imposed. For example, 10% changes relative to the previous bit rate at the GOP boundaries might be allowed if no scene change occurs. If a scene cut takes place, then there is no limitation on bit rate changes.

3. Joint Rate Control at Scene Changes

Previously it was stated that the encoders are running in CBR mode inside the GOPs and that each encoder uses a CBR video buffer verifier model. No buffer under- or overflow is allowed. For example, a goal in the CBR rate control algorithm may be to ensure that buffer fullness at the end of the GOP will be the same as the initial buffer fullness (e.g. 80% of the buffer size). This may not always be the case, however, due to mismatch of the target bit budget and of the actual bits used per picture. Because of the over- or underproduction of bits in a GOP, the buffer fullness will be under or over the initial level, respectively. A considerably large buffer fullness error can accumulate. This error is carried over and tried to be compensated for in the next GOP. This rate control works fine if little or no bit rate changes take place at GOP boundaries. If bit rate changes are abrupt, however, such as at scene changes, a buffer fullness error (BFE) strategy in accordance with the present invention is applied to further improve the picture quality.

If scene change occurs, the buffer fullness error is considered to be zero at the beginning of the new GOP after a scene change. To prevent under- or overflow of the buffers connected to each encoder, the bit rate calculated by Equation (4) is modified as:

$$R_{imod} = R_i + E \cdot f_i / N_i,$$

where $R_i$ is the calculated bit rate for program i according to Equation (4), E is the buffer fullness error bits, $N_i$ is the number of pictures in a GOP and $f_i$ is the frame rate for program i. The bit rate of the program will be increased if the buffer fullness error is positive (the buffer fullness in the beginning of the GOP was less than the initial), or it will be decreased if E is negative. For rate control inside the GOP, the initial buffer fullness is considered as the buffer fullness at the end of the previous GOP instead of using, for e.g., 80% of the buffer size. The BFE strategy results in enhanced picture quality after scene changes.

4. Channel Buffer Size and Feedback Control

Due to the fact that the encoders can operate at different GOP-lengths and structures, or may start to encode at different times, there can be time intervals when the sum of the individual bit rates is larger or smaller than the predefined channel bit rate. To remedy this, a channel buffer is required, which will output the bitstream at exactly the channel bit rate. Two issues have to be considered in relation to this buffer. These are the determination of the minimum size of the buffer and the, control strategy to prevent channel buffer under- and overflow.

Assume that the maximum total deviation from the channel bit rate is $\Delta R_{max}$ and, as a worst case, that the maximum duration of this deviation can be as large as the longest GOP-time among the encoders. For this case, the required minimum size of the channel buffer is determined as:

$$B_s = 2 \cdot \Delta R_{max} \cdot tgop_{max} \quad (6)$$

where $\Delta R_{max} = \Sigma R_i - R_c$, and $tgop_{max}$ is the maximum GOP time.

In Equation (6), a factor of 2 is used because under- as well as overproduction of the channel bit rate is assumed and the buffer filled at first until half of this size, $B_s$, after which it continuously outputs bits at the rate of $R_c$. In this case, the initial delay corresponds to the time required to fill the buffer until half of its size. As an example, if the channel buffer rate is 16 Mbits/s, $\Delta R_{max}$ is 8 Mbits/s and $tgop_{max} = 0.5$ s, the minimum buffer size is 8 Mbits, and the corresponding initial delay is 0.25s at the frame rate of 30 frames/s. Note that if a smaller channel buffer than the one determined by Equation (6) is desired for use in the stat-mux system, then the maximum total deviation from the channel bit rate has to be limited accordingly.

To prevent channel buffer under- or overflow, a buffer model (shown in FIG. 4) is preferably used. The channel buffer model includes predefined guard bands at the top and the bottom of the buffer. These guard bands are used to regulate the distribution of the bit rates. To prevent under- and overflow, the buffer fullness $B_f$ at any time has to fulfill:

$$0 < B_f(t) < B_s \quad (7)$$

The parameter 'a' determines the size of the guard band and it can be chosen, for example, as 0.25.

Depending on the actual buffer fullness, $B_f$, there are three cases, which can be distinguished. These cases together with the corresponding modification of the bit rates are listed below:

Case 1:
This is the case when the buffer fullness is between the guard bands, that is:

$$a \cdot B_s \leq B_f \leq (1-a) \cdot B_s \quad (8)$$

In this case, the calculated bit rates for the programs are not modified generally, except at extreme circumstances.

if $\Sigma R_i > R_c$ and $\Sigma R_i - R_c > (B_s - B_f)/tgop_{max}$ then $R_i = R_i \cdot [R_c + ((1-a) B_s - B_f)/tgop_{max}]/(\Sigma R_i)$ (9)

(No overflow)

if $\Sigma R_i < R_c$ and $R_c - \Sigma R_i > B_f/tgop_{max}$ then $R_i = R_i \cdot [R_c - (B_f - aB_s)/tgop_{max}]/(\Sigma R_i)$ (10)

(no underflow)
otherwise: no action

Case 2:
This is the case when the buffer fullness is in the upper guard band:

$$B_f > (1-a) \cdot B_s \quad (11)$$

In this case only bit rate changes are allowed which will decrease buffer fullness or stay at $B_f$.

if $\Sigma R_i > R_c$ then $R_i = R_i \cdot (R_c/(\Sigma R_i))$ (12)

(Scaling down)

if $\Sigma R_i < R_c$ and $R_c - \Sigma R_i > B_f/tgop_{max}$ then $R_i = R_i \cdot [R_c - aB_s)/tgop_{max}]/(\Sigma R_i)$ (13)

(No underflow)
otherwise: no action

Case 3:
This is the case when the buffer fullness is in the lower guard band:

$$B_f < a \cdot B_s \quad (14)$$

In this case only bit rate changes are allowed which will increase the buffer fullness or stay at $B_f$.

if $\Sigma R_i < R_c$ then $R_i = R_i \cdot (R_c/(\Sigma R_i))$ (15)

(Scaling up)

if $\Sigma R_i > R_c$ and $\Sigma R_i - R_c > (B_s - B_f)/tgop_{max}$ then $R_i = R_i \cdot [R_c + ((1-a)B_s - B_f)/tgop_{max}]/(\Sigma R_i)$ (16)

(No overflow)
otherwise: no action.

Using an MPEG-2 Encoder in the Stat-Mux System

All MPEG-2 encoders used in a multi-program video compression system in accordance with the principles of the present invention must be capable of providing at least the necessary coding statistics required by the joint rate control algorithm discussed above. Encoders must also have the ability to change bit rates at GOP boundaries. To further exploit the advantages of this invention, in the event of scene changes encoders must be able to change GOP structure dynamically, provide quantities for calculating the buffer fullness error and carry out scene change detection and reaction either internally or externally.

6. Process Overview

Figure 5:
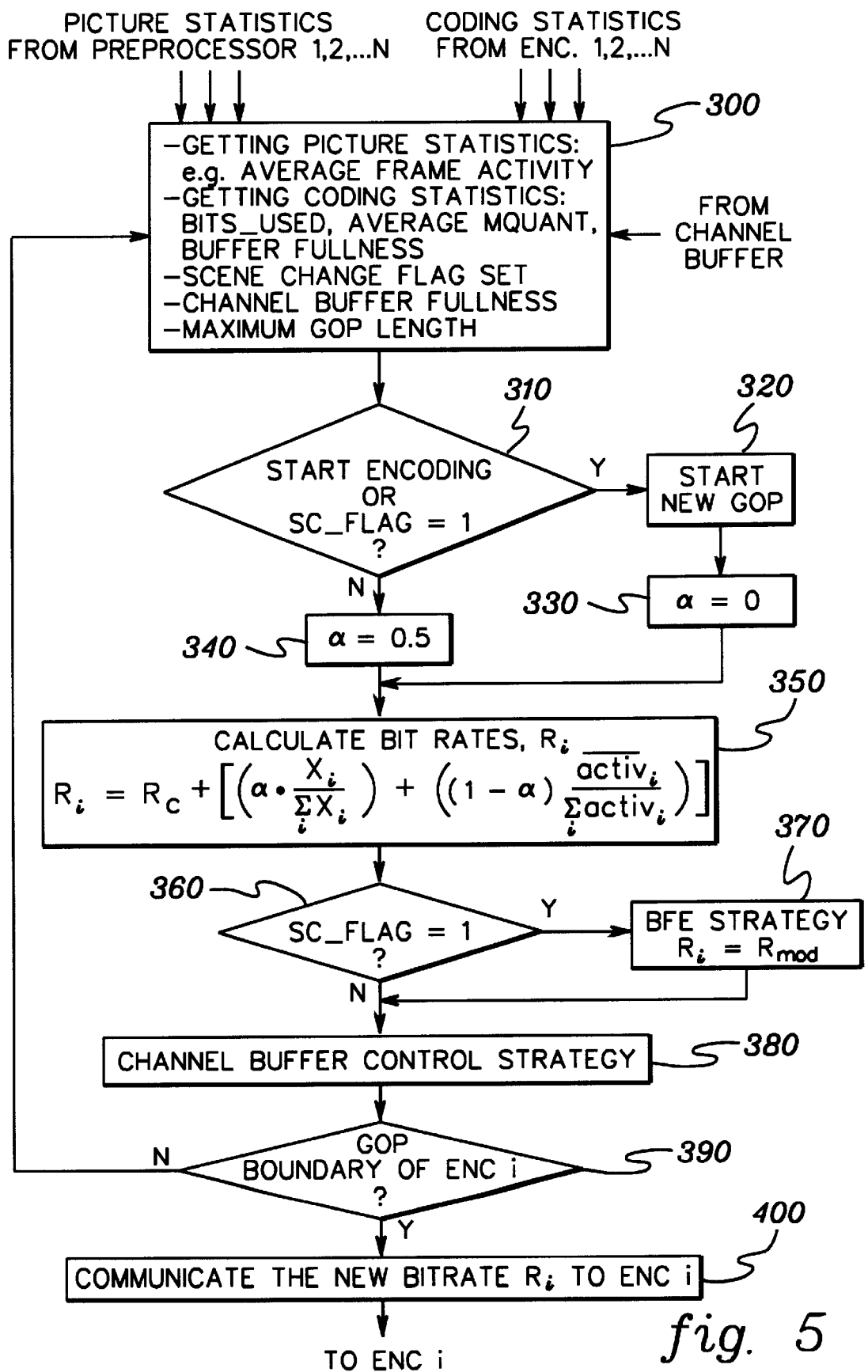
FIG. 5 is a flowchart of one embodiment of a stat-mux rate control processing in accordance with the principles of the present invention.

FIG. 5 depicts an overview of encode processing in accordance with the present invention. Statistics are fed from the individual preprocessors and encoders to the rate controller. These statistics include picture statistics (such as average frame activity) from the preprocessors and coding statistics, including bits used, average MQUANT, and buffer fullness 300. Additionally, information is provided on scene change occurring at each stream of video frames, channel buffer fullness and a maximum GOP length occurring in the system as described above. The channel buffer fullness is received as a feedback signal from the channel buffer itself. The bit rate controller initially determines whether there is a start of encoding or whether a scene change flag has been set, indicative of a scene change 310. If YES, then the first frame of the new scene is encoded as the first picture of a new GOP 320. The variable "α" in equation (4) above is then set to 0 330. By setting α to 0, only picture statistics provided by the preprocessors will be employed at the start of this new GOP in allocating the bitrates among the encoders as described above. Assuming that the scene change flag is not set and that this is not the start of encoding, then the variable a is set to 0.5340. By setting variable a to 0.5, the picture statistics and coding statistics information in equation (4) are essentially weighted equally in determining the bitrate. Those skilled in the art will recognize that the importance of the statistics could be allocated differently without departing from the present invention.

A bit rate $R_i$ is calculated for each encoder using equation (4) 350. Processing then again determines whether the scene change flag is set 360, and if so, a buffer fullness error strategy 370 is employed to modify the bit rate $R_i$ for the encoder. A channel buffer control strategy 380 is implemented as described above, and processing determines whether the current frame is at a GOP boundary of the stream of video frames being encoded at encoder ENC.i 390. If NO, processing returns to collect a next set of input parameters 300. If the current frame is at a GOP boundary, then the new bit rate $R_i$ is communicated to the encoder ENC.i 400.

To again summarize, in accordance with this invention, a joint rate control strategy is presented which dynamically allocates bit rates among multiple encoders for encoding video streams in parallel for multiplexing onto a common channel. The channel bit rate is distributed among the encoders based on relative complexity of the programs and scene changes occurring with the programs. The complexity of the programs is determined based on look-ahead picture statistics, and feedback coding statistics, as well as scene change detection. Picture statistics can be generated, for example, by preprocessors, and the coding statistics and scene change detection signals are generated by the encoders along with the compressed bitstreams. Instead of calculating the target bit rate for each picture, the bit rates are changed at GOP boundaries or if a scene change occurs. This allows the encoders to operate in constant bit rate (CBR) inside the GOPs.

Changing bit rate only at GOP boundaries limits reaction time of the joint rate controller for complexity changes of the programs. To address this issue, the scene change detection is assumed to be carried out between each consecutive picture in a stream of video frames, and it is assumed known prior to encode the first frame in the new scene. Furthermore, an assumption is made that the encoders are capable of changing GOP structure dynamically, which is a capability available on commercially available encoders. If a scene change occurs, the current GOP is prematurely finished and the first picture of the new scene is encoded starting a new GOP. The coding statistics from this first GOP of the new scene are then used, along with the picture statistics, to calculate the bit rate for the subsequent GOP.

In order to improve picture quality in case of scene change, a further modification was developed. Specifically, the buffer fullness error, resulting from the over- or under-production of bits in a GOP, is considered to be zero at the beginning of a new GOP after a scene change. In order to prevent under- or overflow in the buffers connected to each encoder, the bit rate calculated by the joint rate controller is modified. The bit rate of the program will be increased if the buffer fullness error is positive (the buffer fullness in the beginning of the GOP was less than the initial buffer fullness, (e.g., 80% of buffer size)) or it will be decreased if it is negative. This strategy results in a better picture quality after scene change. The concept can also be extended for encoders without dynamic GOP structure capability, and with the scene change detection being carried out externally.

The encoders operate preferably at the same frame rate, but may have different GOP-lengths and structures or begin encoding at different times. Thus, there can be time intervals when the sum of the individual bit rates is larger or smaller than the pre-defined channel bit rate. A channel buffer is incorporated in the system, which will output the multiplexed bit stream exactly at the channel bit rate. A method to determine the minimum size of the channel has also been developed. It is based on the allowable total deviation from the channel bit rate, and maximum GOP time occurring in the system. In order to prevent channel buffer under- or overflow, a buffer feedback is also incorporated into the joint rate controller.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for processing multiple streams of video frames comprising:

analyzing said multiple streams of video frames to determine relative complexity of the video frames comprising said multiple streams of video frames, wherein said analyzing comprises obtaining picture statistics on said relative complexity of said video frames prior to encoding of said multiple streams of video frames;

encoding said multiple streams of video frames in parallel using said relative complexity of the video frames, wherein said encoding comprises adaptively encoding said multiple streams of video frames with change in said relative complexity;

during said encoding, analyzing each stream of video frames to derive coding statistics on at least one characteristic thereof, said coding statistics comprising at least one of an intraframe characteristic or an interframe characteristic, and wherein said adaptively encoding comprises employing both said picture statistics and said coding statistics in adaptively encoding said multiple streams of video frames; and wherein said adaptively encoding comprises adjusting at least one encode bit rate employed by said encoding to encode said multiple streams of video frames with change in said relative complexity, and wherein said adjusting at least one encode bit rate for at least one stream of said multiple streams of video frames only occurs upon beginning of a new group of frames (GOP) within said at least one stream, wherein for said at least one stream of video frames said encode bit rate is constant within each GOP and is variable between GOPs.

2. The method of claim 1, wherein said adaptively encoding employing both said picture statistics and said coding statistics comprises weighting said picture statistics and said coding statistics by predefined amounts in adjusting the at least one encode bit rate employed by said encoding to encode said multiple streams of video frames.

3. The method of claim 2, wherein said weighting comprises weighting said picture statistics 50% and said coding statistics 50% in adjusting said at least one encode bit rate based on said relative complexity of said multiple streams of video frames.

4. The method of claim 1, further comprising performing said adaptively encoding of said multiple streams of video frames upon detection of a scene change in one stream of said multiple streams of video frames, wherein said encoding comprises beginning a new GOP upon detection of the scene change.

5. The method of claim 1, wherein said analyzing comprises preprocessing said multiple streams of video frames to produce an average frame activity for each video frame of said video frames comprising said multiple streams of video frames, and wherein said encoding comprises employing said average frame activities as representative of said relative complexity of the video frames.

6. The method of claim 1, wherein said adaptively encoding comprises adjusting the at least one encode bit rate employed by said encoding based on said picture statistics and said coding statistics of said multiple streams of video frames, and wherein said encoding produces multiple compressed video streams, and said method further comprises buffering each compressed video stream in a buffer, and wherein said adaptively encoding includes for each stream of video frames modifying said at least one encode bit rate for each stream based on fullness of said buffer receiving said compressed video stream.

7. The method of claim 6, further comprising multiplexing said multiple compressed video streams onto a constant bit rate channel.

8. The method of claim 7, further comprising predefining guard bands at upper and lower limits of said buffer and modifying said at least one encode bit rate whenever buffer fullness is within one of said upper and lower guard bands of the buffer.

9. The method of claim 1, wherein said adaptively encoding comprises employing a rate control algorithm to control an encode bit rate of each stream of said multiple streams of video frames, and wherein said method comprises providing said picture statistics and said coding statistics to said rate control algorithm, said picture statistics and said coding statistics being representative of said relative complexity of the video frames comprising said multiple streams of video frames to be encoded.

10. A method for processing multiple streams of video frames comprising:

analyzing said multiple streams of video frames to derive picture statistics on at least one characteristic thereof, said at least one characteristic comprising at least one of an intraframe characteristic or an interframe characteristic;

encoding said multiple streams of video frames in parallel, said encoding including employing at least one controllable encode parameter for each stream of video frames;

adapting said encoding of said multiple streams of video frames using relative information from said picture statistics obtained from said multiple streams of video frames, said adapting including adjusting said at least one controllable encode parameter employed in said encoding of at least one stream of video frames, wherein said encoding of said multiple streams of video frames is adaptive to relative changes in said at least one characteristic;

during said encoding, analyzing each stream of video frames to derive coding statistics on at least one coding characteristic, said at least one coding characteristic comprising at least one of an intraframe coding characteristic or an interframe coding characteristic, and wherein said adapting comprises employing said coding statistics in combination with said picture statistics in adapting said encoding of said at least one stream of video frames; and wherein said at least one controllable encode parameter comprises at least one encode bit rate, and wherein said adapting said encoding for at least one stream only occurs upon beginning of a new group of frames (GOP) within said at least one stream, wherein for said at least one stream of video frames said encode bit rate is constant within each GOP and is variable between GOPs.

11. The method of claim 10, wherein said picture statistics are representative of an average frame activity, and wherein said coding statistics comprise at least one of bits used, an average MQUANT, or buffer fullness during encoding of said streams of video frames.

12. The method of claim 10, wherein said adapting comprises employing both said picture statistics and said coding statistics in adjusting said at least one encode bit rate employed in encoding said at least one stream of video frames.

13. The method of claim 12, further comprising employing said picture statistics and said coding statistics in a predefined relation in adjusting said at least one encode bit rate employed in said encoding of said at least one stream of video frames.

14. The method of claim 12, wherein said at least one controllable encode parameter comprises an encode bit rate for each stream of video frames.

15. The method of claim 10, wherein said encoding produces multiple compressed video streams, and wherein said method further comprises multiplexing each compressed video stream onto a constant bit rate channel.

16. The method of claim 15, wherein said method further comprises buffering each compressed video stream prior to said multiplexing, and wherein said analyzing of each stream of video frames to derive said coding statistics comprises deriving at least one of statistics on bits used, average MQUANT, buffer fullness or scene change.

17. The method of claim 10, further comprising employing only said picture statistics by said adapting when starting encoding of said multiple streams of video frames and upon detection of a scene change in one of said multiple streams of video frames, wherein said encoding comprises beginning a new GOP upon detection of the scene change.

18. A system for processing multiple streams of video frames comprising:

means for analyzing said multiple streams of video frames to determine picture statistics representative of relative complexity of the video frames comprising said multiple streams of video frames;

multiple encoders for encoding said multiple streams of video frames in parallel, each encoder receiving one stream of video frames of said multiple streams of video frames, said multiple encoders each comprising means for generating coding statistics on at least one characteristic of said stream of video frames being encoded thereby, said coding statistics comprising at least one of an intraframe characteristic or an interframe characteristic;

a joint controller coupled to each encoder of said multiple encoders and to said means for analyzing for dynamically adapting encoding of at least one stream of video frames of the multiple streams of video frames based on said picture statistics and said coding statistics derived from the video frames comprising the multiple streams of video frames; and wherein the joint controller comprises means for adjusting at least one encode bit rate employed by at least one encoder of said multiple encoders, wherein said adjusting only occurs upon beginning of a new group of frames (GOP) within said at least one stream, wherein for said at least one stream of video frames said encode bit rate is constant within each GOP and is variable between GOPs.

19. The system of claim 18, wherein said means for analyzing comprises multiple preprocessors coupled to receive said multiple streams of video frames, each preprocessor receiving a different stream of video frames, and wherein said multiple preprocessors output said picture statistics, said picture statistics providing information on said relative complexity of the video frames comprising said multiple streams of video frames, and being provided to said joint controller for dynamically adapting said encoding of said at least one stream of video frames.

20. The system of claim 18, wherein said joint controller comprises means for employing only said picture statistics when starting encoding of said multiple streams of video frames and upon detection of a scene change in said at least one stream of video frames.

21. The system of claim 18, wherein said joint controller comprises means for weighting said picture statistics and said coding statistics by predefined amounts.

22. The system of claim 18, wherein said picture statistics comprise an average frame activity for a video frame of said video frames comprising said multiple streams of video frames to be encoded, and wherein said coding statistics comprise at least one of bits used, an average MQUANT or buffer fullness during encoding of a video frame of said video frames comprising said multiple streams of video frames.

23. A system for processing multiple streams of video frames comprising:
  means for analyzing said multiple streams of video frames to derive picture statistics on at least one characteristic thereof, said at least one characteristic comprising at least one of an intraframe characteristic or an interframe characteristic;
  multiple encoders for encoding said multiple streams of video frames in parallel, each encoder receiving one stream of video frames of said multiple streams of video frames, and each encoder employing an encode bit rate in encoding its stream of video frames, wherein said multiple encoders further comprises coding means for analyzing each stream of video frames during said encoding to derive coding statistics on at least one coding characteristic, said at least one coding characteristic comprising at least one of an intraframe coding characteristic or an interframe coding characteristic; and
  a joint controller coupled to each encoder of said multiple encoders and to said means for analyzing for dynamically adapting encoding of at least one stream of video frames of the multiple streams of video frames based on relative information derived from said picture statistics and said coding statistics, said adapting including adjusting said encode bit rate employed in said encoding of at least one stream of video frames, wherein said adjusting only occurs upon beginning of a new group of frames (GOP) within said at least one stream of video frames, wherein for said at least one stream said encode bit rate is constant within each GOP and is variable between GOPs.

24. The system of claim 23, wherein said picture statistics are representative of an average frame activity, and wherein said coding statistics comprise at least one of bits used, an average MQUANT, or buffer fullness during encoding of said streams of video frames.

25. The system of claim 23, wherein said joint controller comprises means for employing both said picture statistics and said coding statistics in adjusting said at least one encode bit rate employed in encoding said at least one stream of video frames.

26. The system of claim 23, wherein said joint controller comprises means for employing said picture statistics and said coding statistics in a predefined relation in adjusting said at least one encode bit rate employed in said encoding of said at least one stream of video frames.

27. The system of claim 23 wherein said multiple encoders produce multiple compressed video streams, and wherein said system further comprises a multiplexer for multiplexing said compressed video streams onto a constant bit rate channel.

28. They system of claim 27, wherein said system further comprises means for buffering each compressed video stream prior to said multiplexing, and wherein said coding means to derive said coding statistics comprises means for deriving at least one of statistics on bits used, average MQUANT, buffer fullness or scene change.

29. An article of manufacture, comprising:
  at least one computer usable medium having computer readable program code means embodied therein for causing the processing of multiple streams of video frames, the computer readable program code means in the article of manufacture comprising:
    (i) computer readable program code means for causing a computer to effect analyzing the multiple streams of video frames to determine relative complexity of the video frames comprising the multiple streams of video frames, wherein said analyzing comprises obtaining picture statistics on said relative complexity of said video frames prior to encoding of said multiple streams of video frames;
    (ii) computer readable program code means for causing a computer to effect encoding the multiple streams of video frames in parallel using the relative complexity of the video frames, wherein the encoding comprises adaptively encoding the multiple streams of video frames with a change in said relative complexity;
    (iii) computer readable program code means for causing a computer to effect analyzing each stream of video frames during said encoding to derive coding statistics on at least one characteristic thereof, said coding statistics comprising at least one of an intraframe characteristic or an interframe characteristic, and wherein said computer readable program code means for causing a computer to effect adaptively encoding comprises computer readable program code means for causing a computer to effect employing both said picture statistics and said coding statistics in adaptively encoding said multiple streams of video frames; and
    (iv) computer readable program code means for causing a computer to effect adjusting at least one encode bit rate employed by said encoding to encode said multiple streams of video frames, and wherein said adjusting the at least one encode bit rate for at least one stream of the multiple streams of video frames only occurs upon beginning of a new group of frames (GOP) within said at least one stream, wherein for said at least one stream of video frames said encode bit rate is constant within each GOP and is variable between GOPs.

30. The article of manufacture of claim 29, wherein said computer readable program code means for causing a computer to effect adaptively encoding employing both said picture statistics and said coding statistics comprises computer readable program code means for causing a computer to effect weighting said picture statistics and said coding statistics by predefined amounts in adjusting the at least one encode bit rate employed by said encoding to encode said multiple streams of video frames.

31. An article of manufacture, comprising:
  at least one computer usable medium having computer readable program code means embodied therein for causing the processing of multiple streams of video frames, the computer readable program code means in the article of manufacture comprising:
    (i) computer readable program code means for causing a computer to effect analyzing said multiple streams of video frames to derive picture statistics on at least one characteristic thereof, said at least one characteristic comprising at least one of an intraframe characteristic or an interframe characteristic;
    (ii) computer readable program code means for causing a computer to effect encoding said multiple streams of video frames in parallel, said encoding including employing at least one controllable encode parameter for each stream of video frames;

(iii) computer readable program code means for causing a computer to effect adapting said encoding of said multiple streams of video frames using relative information from said picture statistics obtained from said multiple streams of video frames, said adapting including adjusting said at least one controllable encode parameter employed in said encoding of at least one stream of video frames, wherein said encoding of said multiple streams of video frames is adaptive to changes in said relative information;

(iv) computer readable program code means for causing a computer to effect analyzing each stream of video frames during said encoding to derive coding statistics on at least one coding characteristic, said at least one coding characteristic comprising at least one of an intraframe coding characteristic or an interframe coding characteristic, and wherein said computer readable program code means for causing a computer to effect adapting comprises computer readable program code means for causing a computer to effect employing said coding statistics in combination with said picture statistics in adapting said encoding of said at least one stream of video frames; and (v) wherein said at least one controllable encode parameter comprises at least one encode bit rate, and wherein said adapting said encoding for at least one stream only occurs upon beginning of a new group of frames (GOP) within said at least one stream, wherein for said at least one stream of video frames said encode bit rate is constant within each GOP and is variable between GOPs.

32. The article of manufacture of claim 31, wherein said picture statistics are representative of an average frame activity, and said coding statistics comprise at least one of bits used, an average MQUANT, or buffer fullness during encoding of said streams of video frames.

* * * * *